United States Patent
Hiroumi et al.

(10) Patent No.: US 6,224,306 B1
(45) Date of Patent: May 1, 2001

(54) TOOL HOLDER

(75) Inventors: Takayasu Hiroumi, Osaka; Yasushi Fukuta, Tottori, both of (JP)

(73) Assignee: Showa Tool Co., Ltd., Osaka (JP)

( * ) Notice: Subject to any disclaimer, the term of this patent is extended or adjusted under 35 U.S.C. 154(b) by 0 days.

(21) Appl. No.: 09/401,721

(22) Filed: Sep. 23, 1999

(30) Foreign Application Priority Data

| Sep. 25, 1998 | (JP) | 10-271589 |
| Dec. 4, 1998 | (JP) | 10-345316 |

(51) Int. Cl.$^7$ .................................................. B23B 31/00
(52) U.S. Cl. ........................ 409/234; 279/143; 408/239 A
(58) Field of Search .................................. 409/232, 234; 408/239 A, 238; 279/143, 145

(56) References Cited

U.S. PATENT DOCUMENTS

| 3,136,217 | * | 6/1964 | Swanson et al. | 409/232 |
| 3,554,080 | * | 1/1971 | Hermann | 408/238 |
| 4,714,389 | * | 12/1987 | Johne | 408/240 |
| 4,840,520 | * | 6/1989 | Pfalzgraf | 409/232 |
| 4,886,402 | * | 12/1989 | Pfalzgraf | 409/234 |
| 5,030,047 | * | 7/1991 | Pfalzgraf | 409/234 |
| 5,716,173 | * | 2/1998 | Matsumoto | 408/239 A |
| 5,775,857 | * | 7/1998 | Johne | 409/234 |
| 5,964,556 | * | 10/1999 | Toyomoto | 408/239 A |
| 6,077,003 | * | 6/2000 | Laube | 409/234 |

FOREIGN PATENT DOCUMENTS

263484 * 1/1989 (DE) ................................ 408/239 A

* cited by examiner

Primary Examiner—Daniel W. Howell
(74) Attorney, Agent, or Firm—Wenderoth, Lind & Ponack, L.L.P.

(57) ABSTRACT

A tool holder has a shank, a flange and a tool holding portion. From its front to rear end, the shank has on its outer periphery a first cylindrical surface, a tapered surface, and a second cylindrical surface. A tapered sleeve is mounted on the shank. Belleville springs are mounted between the large-diameter end of the tapered sleeve and the flange of the tool holder. The tapered sleeve is formed with a tapered outer surface adapted to be brought into close contact with a tapered inner surface of a bore formed in the spindle, and a cylindrical inner surface adapted to be brought into close contact with the second cylindrical surface of the shank. If a gap forms between the spindle and the tapered sleeve when the spindle is rotating at a high speed, the tapered sleeve is urged by the belleville springs in such a direction that the gap disappears, thereby maintaining a centripetal tendency and rigidity.

9 Claims, 9 Drawing Sheets

FIG. 6A
FIG. 6B
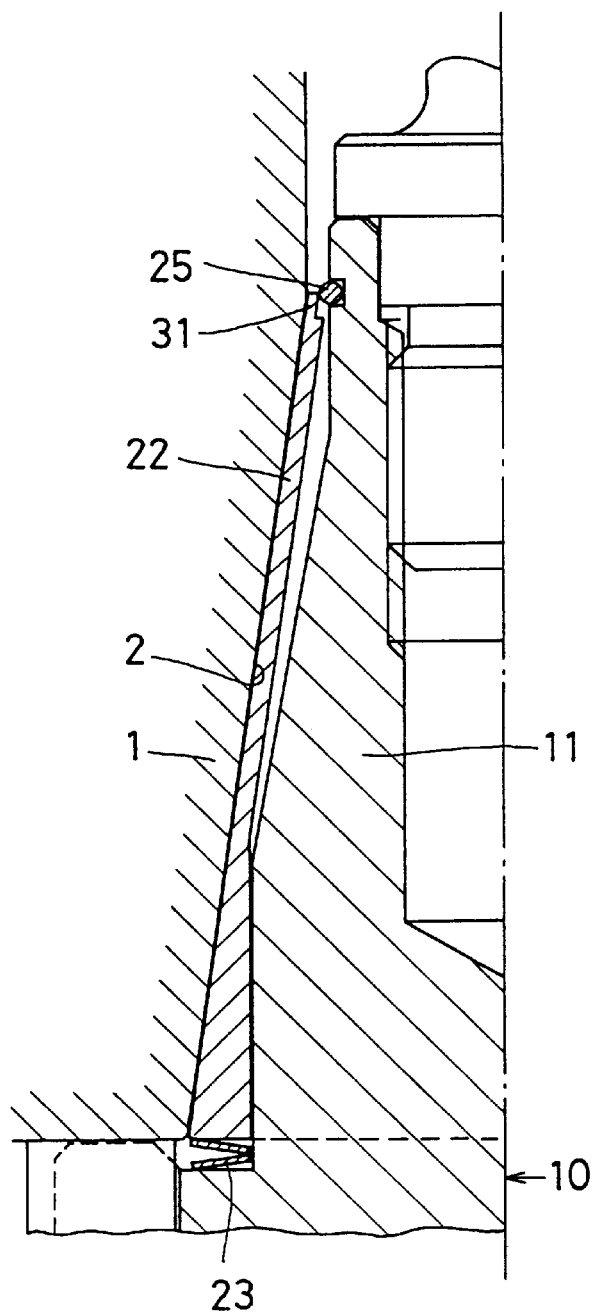
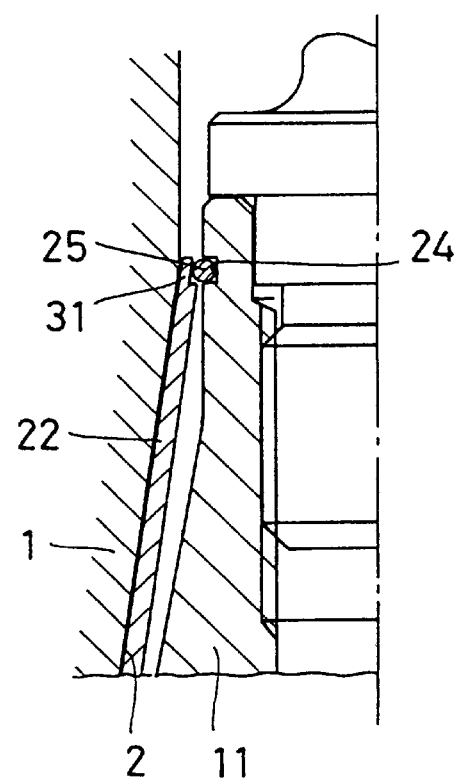

TOOL HOLDER

BACKGROUND OF THE INVENTION

This invention relates to a tool holder for detachably holding various tools such as drills and end mills.

FIG. 8 shows a conventional tool holder detachably mounted on the spindle of a machining center. It comprises a tool holding portion 40 for detachably holding a tool, a flange 41 keyed to the spindle 1 such that torque is transmitted from the spindle, and a tapered shank 42 adapted to be inserted in a tapered bore 2 formed in the spindle 1. A pull stud 43 is provided at the tip of the tapered shank 42.

The tool holder is coupled to the spindle 1 by inserting the tapered shank 42 into the bore 2 of the spindle, gripping the pull stud 43 with a clamp (not shown) housed in the spindle, and pulling it in.

There are two types of tool holders, i.e. a single-face bind type in which only a tapered surface contacts the spindle 1, and a two-face bind type. The single-face bind type is a type in which the tapered outer surface of the tapered shank 42 is brought into close contact with the inner wall of the tapered bore 2 as shown in FIG. 8. The two-face bind type is a type in which the end face of the flange 41 is brought into close contact with the end face of the spindle 1 and the tapered outer surface 42a of the tapered shank 42 comes into close contact with the tapered inner wall 2a of the tapered bore 2 as shown in FIG. 9.

Tool holders of either type have the following problems. When the spindle 1 begins to rotate at a high speed around 20000 rpm, the diameter of the bore 2 tends to increase under centrifugal force as shown by chain lines a as shown in FIGS. 8 and 9. Thus, with the single-face bind type shown in FIG. 8, a gap forms between the tapered inner surface 2a of the bore 2 and the tapered outer surface 42a of the tapered shank 42. The gap causes the tool holder to be pulled further into the spindle, so that the tip of the tool T held by the tool holder tends to run out and/or displace axially. This makes accurate machining difficult.

With the two-face bind type shown in FIG. 9, too, a gap forms between the tapered inner surface 2a of the bore 2 and the tapered outer surface 42a of the tapered shank 42, though the tool holder is not pulled into the spindle. This lowers the rigidity of the tool holder, thus making accurate machining impossible.

An object of this invention is to provide a tool holder which can maintain rigidity even if the inner diameter of the shank inserting bore increases when the spindle is revolving at a high speed.

SUMMARY OF THE INVENTION

According to this invention, there is provided a tool holder for detachably supporting a tool. The tool holder comprises a shank adapted to be inserted in a tapered bore formed in a spindle of a machine tool, a flange adapted to abut an end face of the spindle when the shank is pulled into the spindle, and a tool holding portion for detachably supporting a tool. The shank has on an outer periphery thereof a first cylindrical surface formed near its front end and a second cylindrical surface having a larger diameter than the first cylindrical surface at its rear end near the flange. The holder further comprises a tapered sleeve mounted on the shank, a resilient device biasing the tapered sleeve toward the front end of the shank, and a fall-off prevention structure for preventing the tapered sleeve from moving off the front end of the shank. The tapered sleeve is formed with a tapered outer surface adapted to be brought into close contact with the tapered inner surface of the tapered bore formed in the spindle, and an inner surface adapted to be brought into close contact with the second cylindrical surface of the shank. The tapered sleeve is thin enough so as to be resiliently deformable inwardly by coming into contact with the tapered inner surface of the tapered bore of the spindle when moved axially due to bias by the resilient device.

With this arrangement, when the inner diameter of the shank bore of the spindle increases under centrifugal force at high speed so that a gap forms between the tapered inner wall of the spindle bore and the tapered outer surface of the tapered sleeve, the resilient device urges the tapered sleeve to move it axially in a direction to remove the gap and thereby move into close contact with the tapered inner wall of the spindle.

Also, axial movement of the tapered sleeve decreases its inner diameter, so that the tapered sleeve tightly fits on the second cylindrical surface of the shank with interference. This insures that workpieces can be worked with the tool with high precision.

The inner diameter of the tapered sleeve at its small-diameter end should be substantially equal to the diameter of the first cylindrical surface of the shank to maintain the centripetal tendency and rigidity of the tool holder.

The provision of relieved portions at the large-diameter end of the tapered sleeve makes it elastically deformable inwardly when it is moved due to axially bias by the resilient device into contact with the tapered inner wall of the shank receiving bore of the spindle.

Other features and objects of the present invention will become apparent from the following description made with reference to the accompanying drawings, in which:

BRIEF DESCRIPTION OF THE DRAWINGS

FIG. 6A is a sectional view of another embodiment of tool holder;

FIG. 6B is a sectional view showing the state of the tool holder when the spindle is resiliently deformed;

DETAILED DESCRIPTION OF THE PREFERRED EMBODIMENT

Figure 1:
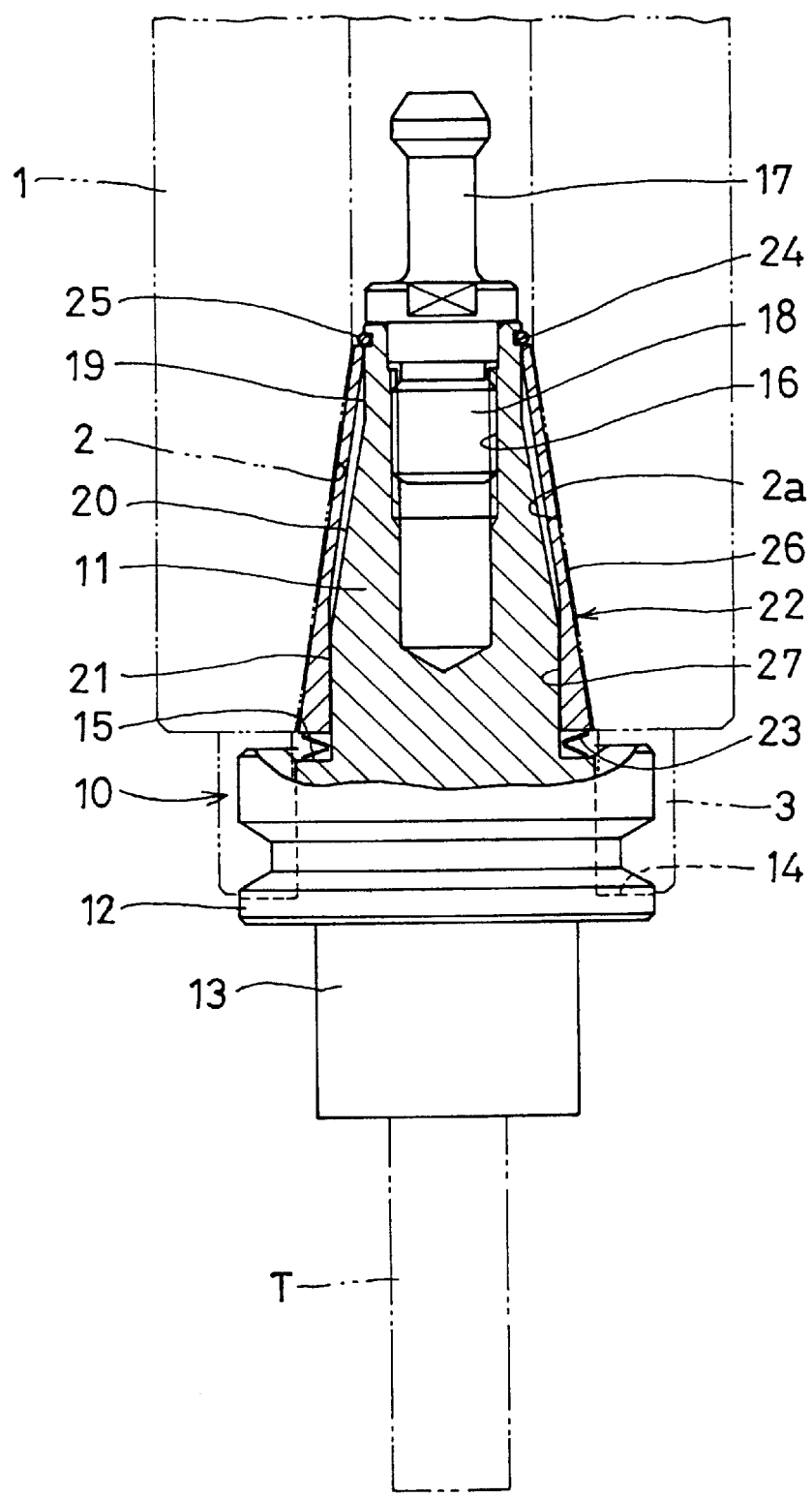
FIG. 1 is a vertical sectional front view of a tool holder embodying this invention.

Embodiments of this invention are described with reference to FIGS. 1 to 7. As shown in FIG. 1, the tool holder body 10 has a shank 11 which is inserted in a tapered bore 2 formed in the spindle 1 of a machine tool, a flange 12 adapted to abut the end face of the spindle 1 when the shank 11 is pulled in, and a tool holding portion 13 for detachably supporting a tool. A tool T is detachably mounted on the tool holding portion 13 by means of an unillustrated chuck such as a collet chuck.

The flange 12 has diametrically opposite key grooves 14 that can accept drive keys 3 provided on the tip of the spindle 1. When the drive keys 3 engage in the key grooves 14, torque can be transmitted from the spindle to the tool holder body 10. A spring housing recess 15 is formed in top surface of the flange 12 around the shank 11.

The shank 11 has a threaded hole 16 having an opening at its tip. A threaded shaft 18 at the rear end of a pull stud 17 is threaded into the threaded hole 16.

From its front to rear end, the shank 11 has on its outer periphery a first cylindrical surface 19, a tapered surface 20, and a second cylindrical surface 21. But the tapered surface 20 may be omitted, and the second cylindrical surface 21 having a larger diameter than the first cylindrical surface 19 may be provided at the rear end of the first cylindrical surface 19.

A tapered sleeve 22 is mounted on the shank 11. It is biased toward the front end of the shank by a resilient device, such as a plurality of belleville springs 23 mounted between its large-diameter end face and the bottom of the recess 15, and is prevented from coming off by a snap ring 25 mounted in a groove 24 formed in the first cylindrical surface 19.

The tapered sleeve 22 has a tapered outer surface 26 to be brought into close contact with a tapered inner surface 2a of the bore 2, and a cylindrical inner surface 27 to be brought into close contact with the second cylindrical surface 21 of the shank 11. The inner surface 27 may be slightly tapered instead. At its small-diameter end, the tapered sleeve 22 has an inner diameter about equal to the outer diameter of the first cylindrical surface 19.

To mount this tool holder, the tapered sleeve 22 is inserted into the bore 2 of the spindle 1, and the tool holder is then pulled into the spindle by gripping the pull stud 17 with a clamp mounted inside the spindle 1.

Figure 2:
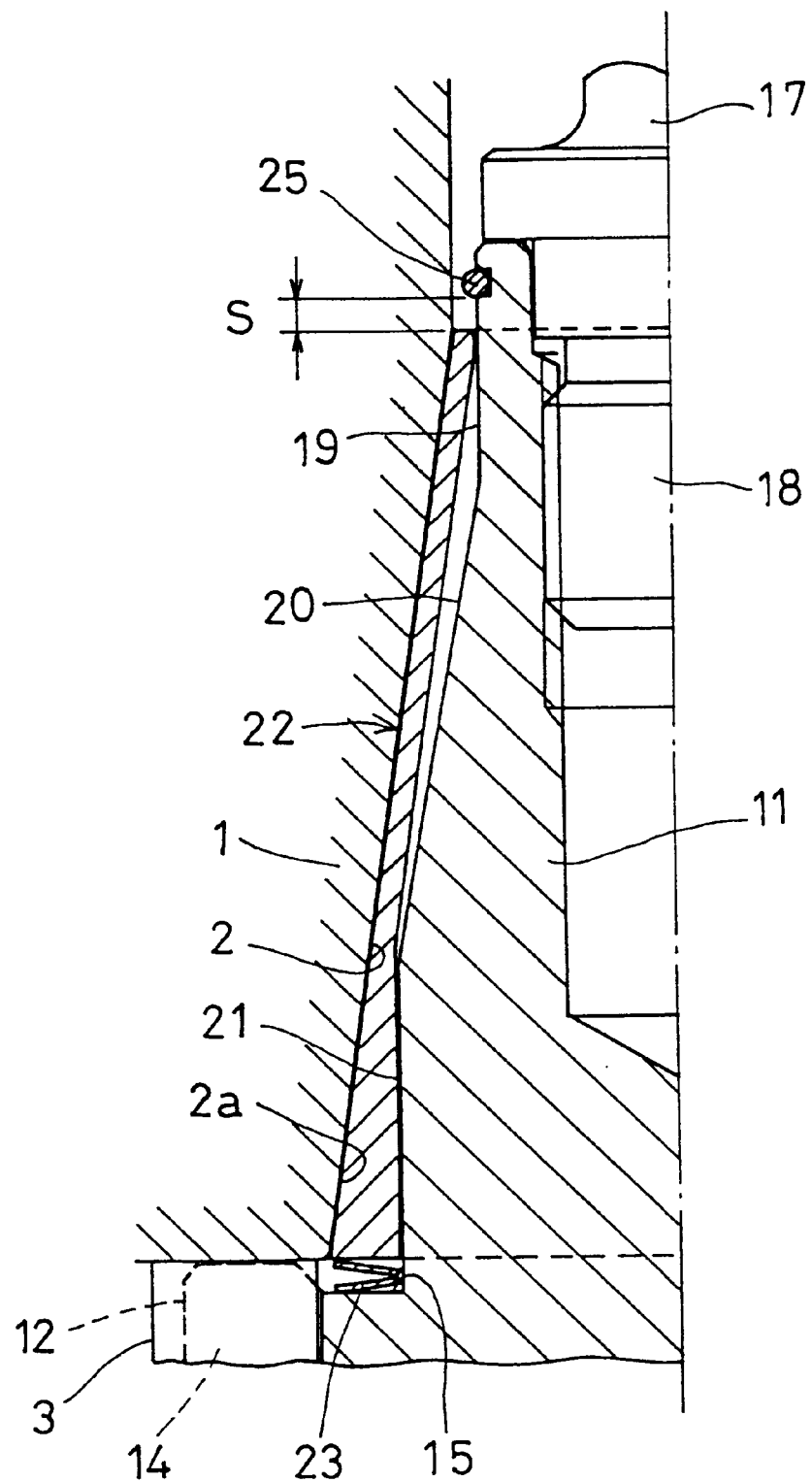
FIG. 2 is a partial enlarged sectional view of the tool holder of FIG. 1.

FIG. 2 shows the tool holder when pulled into the spindle. In this state, the end face of the flange 12 is in close contact with the end face of the spindle 1 and the tapered outer surface 26 of the tapered sleeve 22 is in close contact with the tapered inner surface 2a of the bore 2 with a predetermined gap S defined between the front end of the tapered sleeve 22 and the snap ring 25. The inner surface 27 of the tapered sleeve 22 is in close contact with the second cylindrical surface 21 of the shank 11.

Thus, the tool holder is bound both in the axial and radial directions of the bore 2.

With the tool holder mounted as shown, when the spindle 1 is rotated at a low speed, e.g. 3000 rpm, its rotation is transmitted to the tool holder through the drive keys 3. The tool holder thus rotates with high accuracy.

When the spindle 1 is accelerated to a high speed about 20000 rpm, the inner diameter of the bore 2 may increase under centrifugal force.

Figure 3:
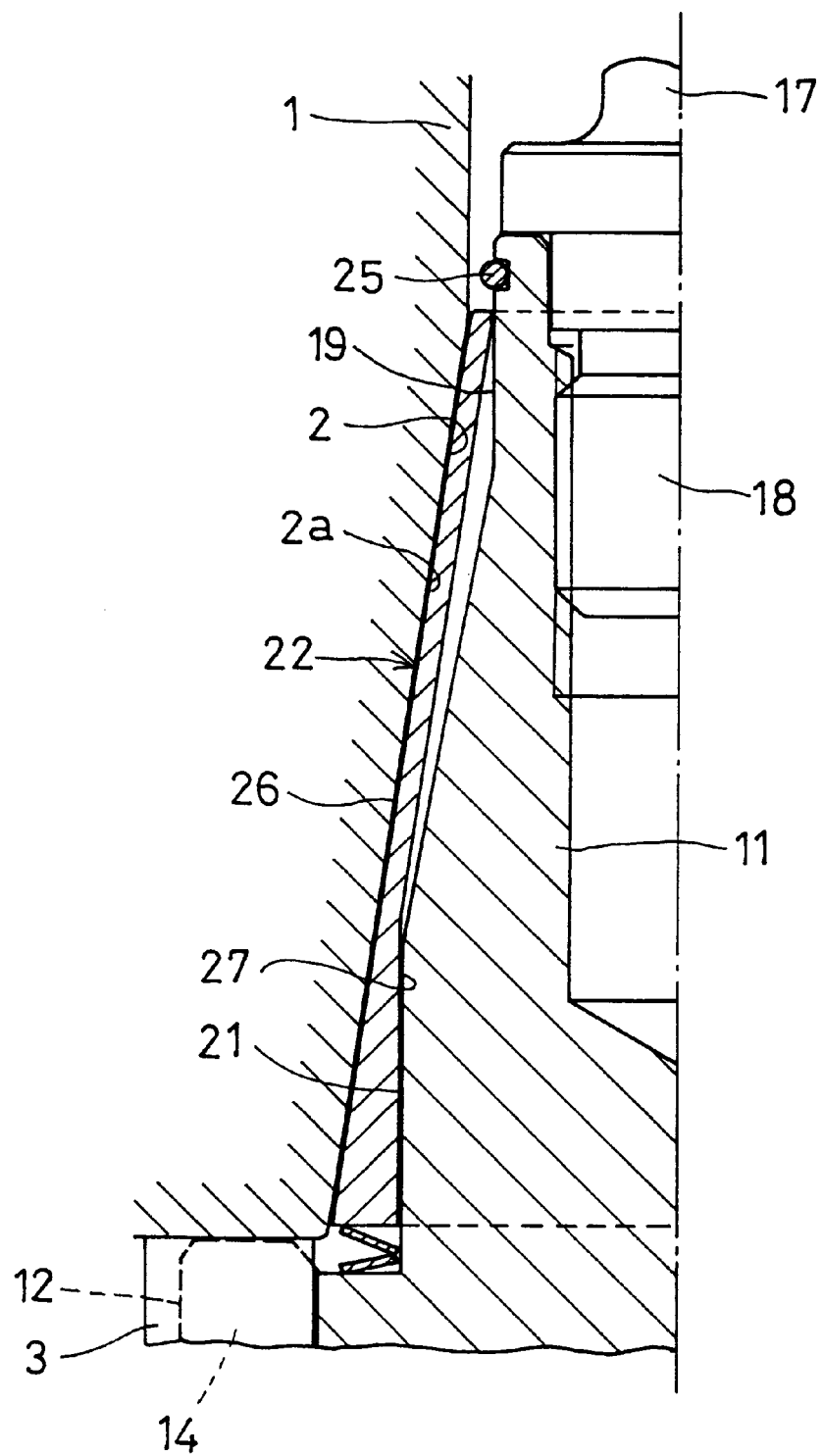
FIG. 3 is a sectional view showing the state of the tool when the spindle is resiliently deformed.

If this happens, a gap forms between the tapered inner surface 2a of the bore 2 and the tapered outer surface 26 of the tapered sleeve 22. But as soon as such a gap forms, the tapered sleeve 22 is urged by the belleville springs 23 to move axially until this gap disappears and its tapered outer surface 26 comes into close contact with the tapered inner surface 2a of the bore 2 again as shown in FIG. 3.

When the tapered sleeve 22 is moved axially, its inner surface 27 decreases in diameter and tightly fits against the second cylindrical surface 21 with interference.

The tool holder thus remains restricted and maintains high rigidity. High-precision machining of workpieces is thus possible.

In order for the tapered sleeve 22 to decrease in diameter and press against the second cylindrical surface 21 when the tapered sleeve 22 is moved axially by the belleville springs 23, the sleeve should have a sufficiently small wall thickness, preferably 5 mm or under, at its large-diameter end for elastic deformation.

Figure 4A:
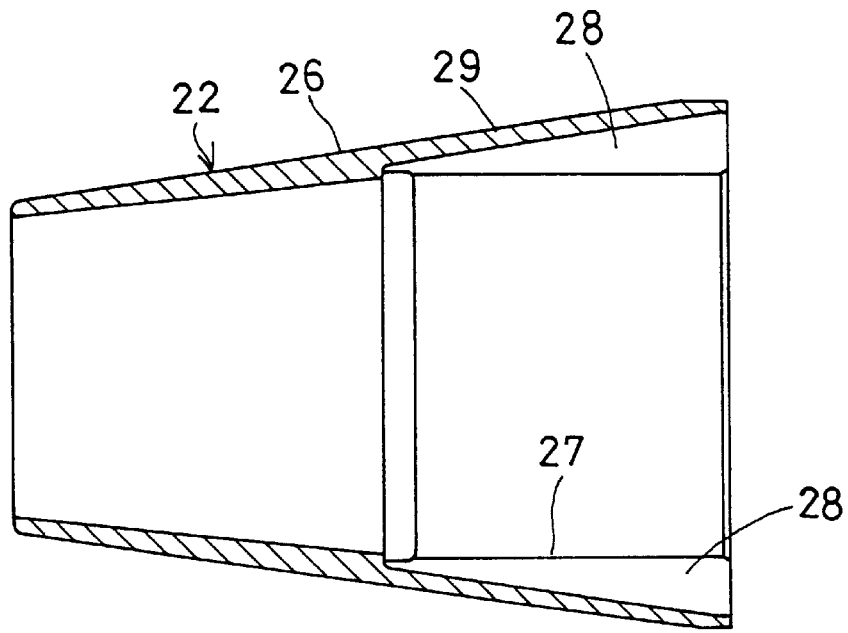
FIG. 4A is a vertical sectional front view of a different tapered sleeve embodying the invention.
Figure 4B:
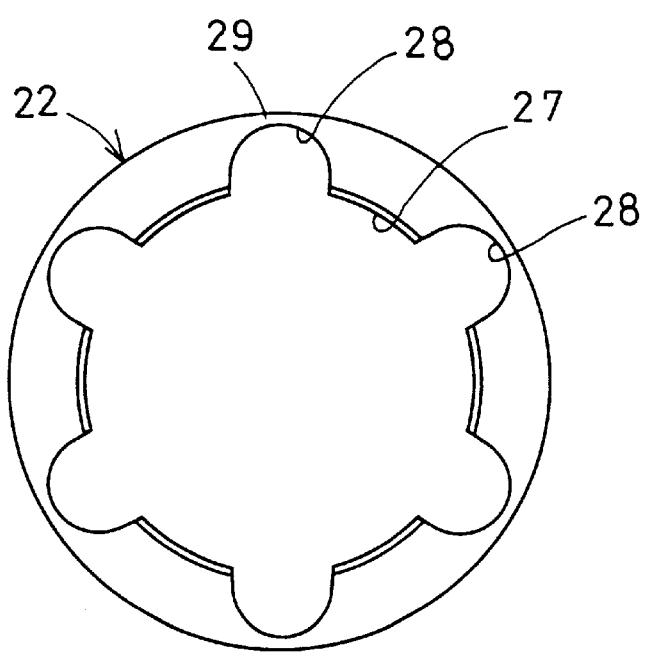
FIG. 4B is a side view thereof.

As shown in FIGS. 4A and 4B, axial grooves 28 may be formed in the cylindrical inner surface 27 of the tapered sleeve 22 at angular intervals to define thin-walled portions 29 outside of the grooves 28 to facilitate radially inward elastic deformation of the tapered sleeve 22.

Figure 5A:
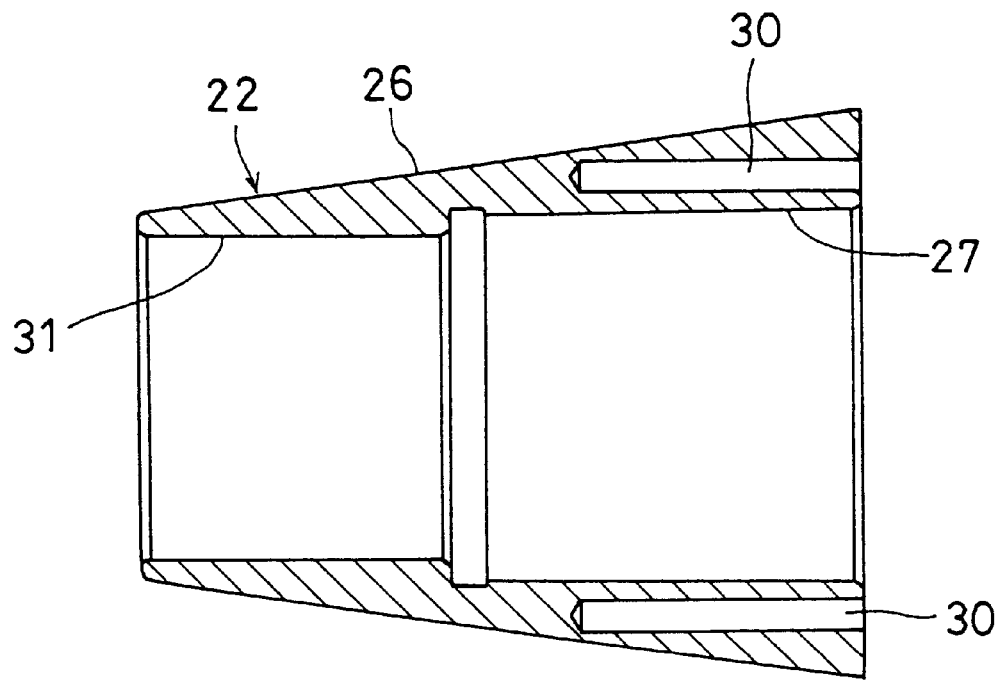
FIG. 5A is a vertical sectional front view of another type of tapered sleeve embodying the invention.
Figure 5B:
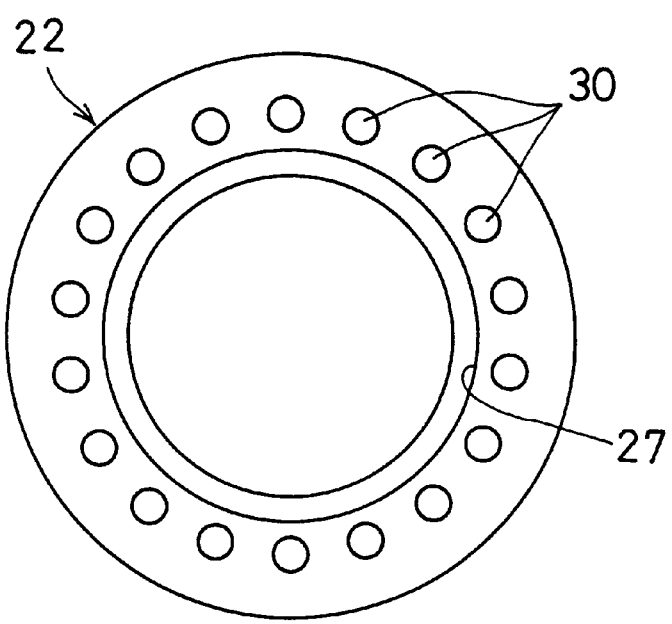
FIG. 5B is a side view thereof.

As shown in FIGS. 5A and 5B, axial holes 30 having openings at the large-diameter end of the tapered sleeve 22 may be formed at angular intervals to facilitate radially inward elastic deformation of the tapered sleeve 22. In this example, the inner surface 27 is tapered toward the large-diameter end of the sleeve, and a cylindrical inner surface 31 of the sleeve 22 having a greater diameter than the first cylindrical outer surface 19 of the shank 11 is formed near the front end, contiguous with the inner surface 27.

In the embodiment of FIGS. 1 through 3, the snap ring 25 keeping the tapered sleeve 22 from coming off may expand under centrifugal force at high speed and come out of the groove 24. To prevent this, in the arrangement of FIGS. 6A and 6B, a tubular rib 31 is formed at the small-diameter end of the tapered sleeve 22 so as to oppose the snap ring 25. The tubular rib 31 prevents the snap ring 25 from coming off by restricting the expansion of the snap ring.

The length of the rib 31 is such that the rib 31 will not hinder the tapered sleeve 22 from moving axially when the tapered sleeve 22 is urged upwardly by the belleville springs 23 as shown in FIG. 6B.

Figure 7:
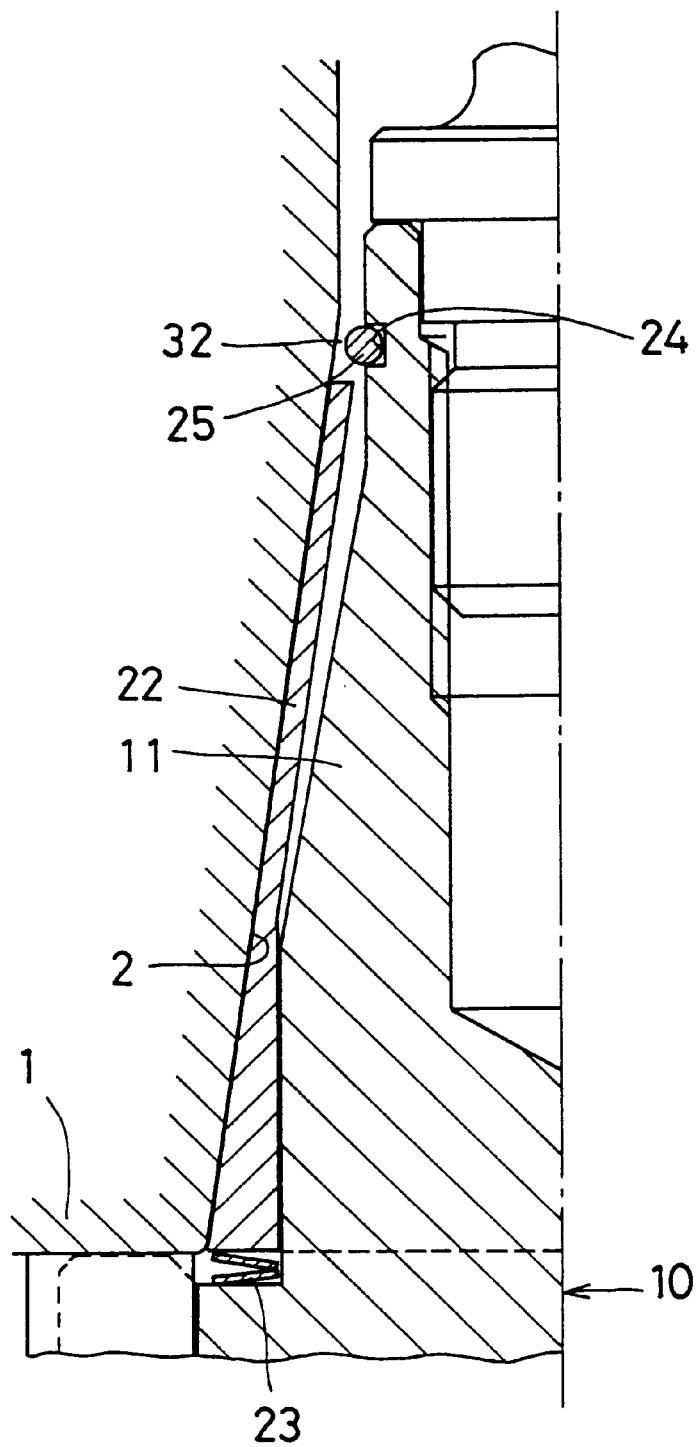
FIG. 7 is a sectional view of still another embodiment of tool holder.
Figure 8:
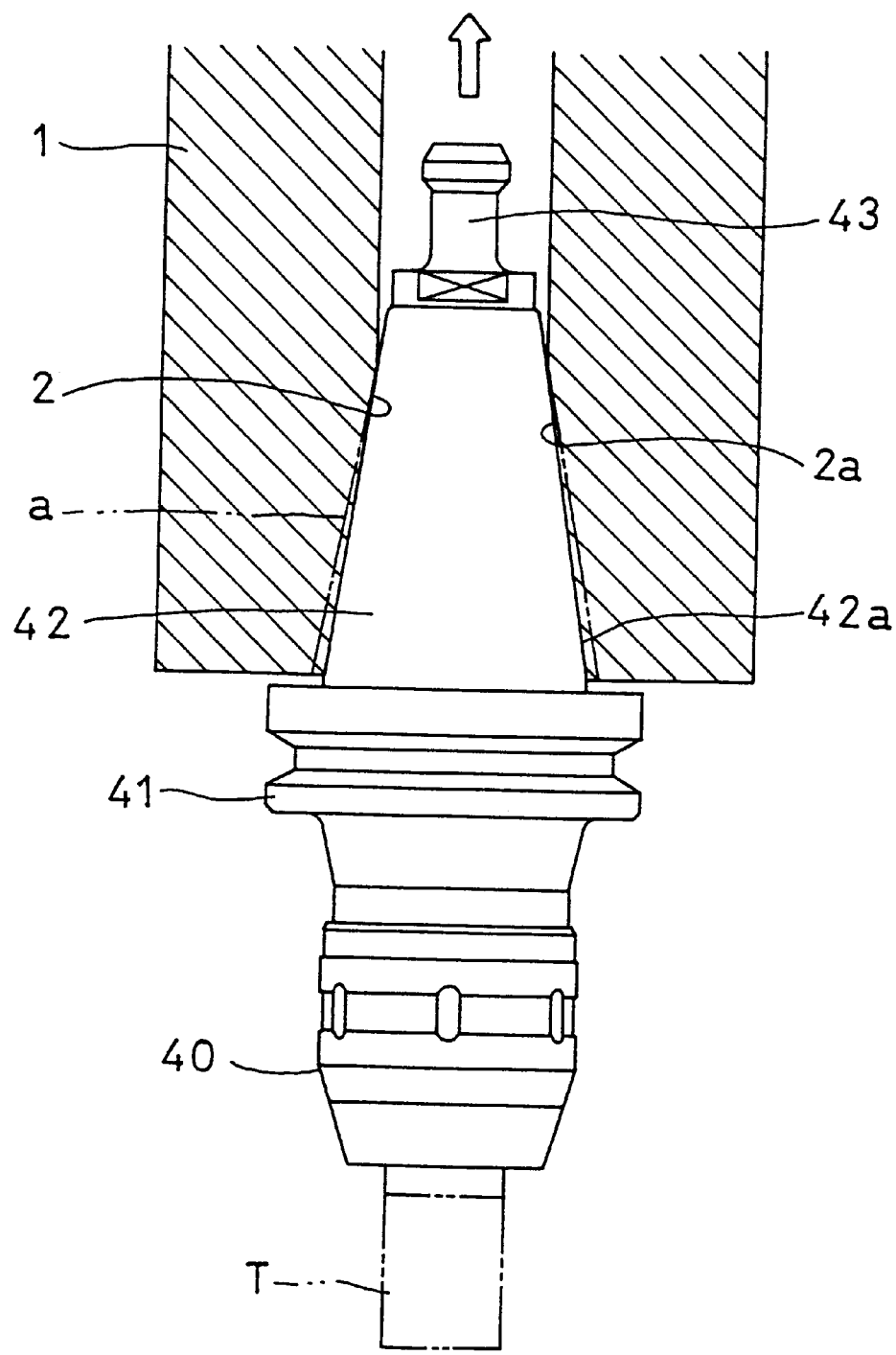
FIG. 8 is a sectional view showing a conventional tool holder.
Figure 9:
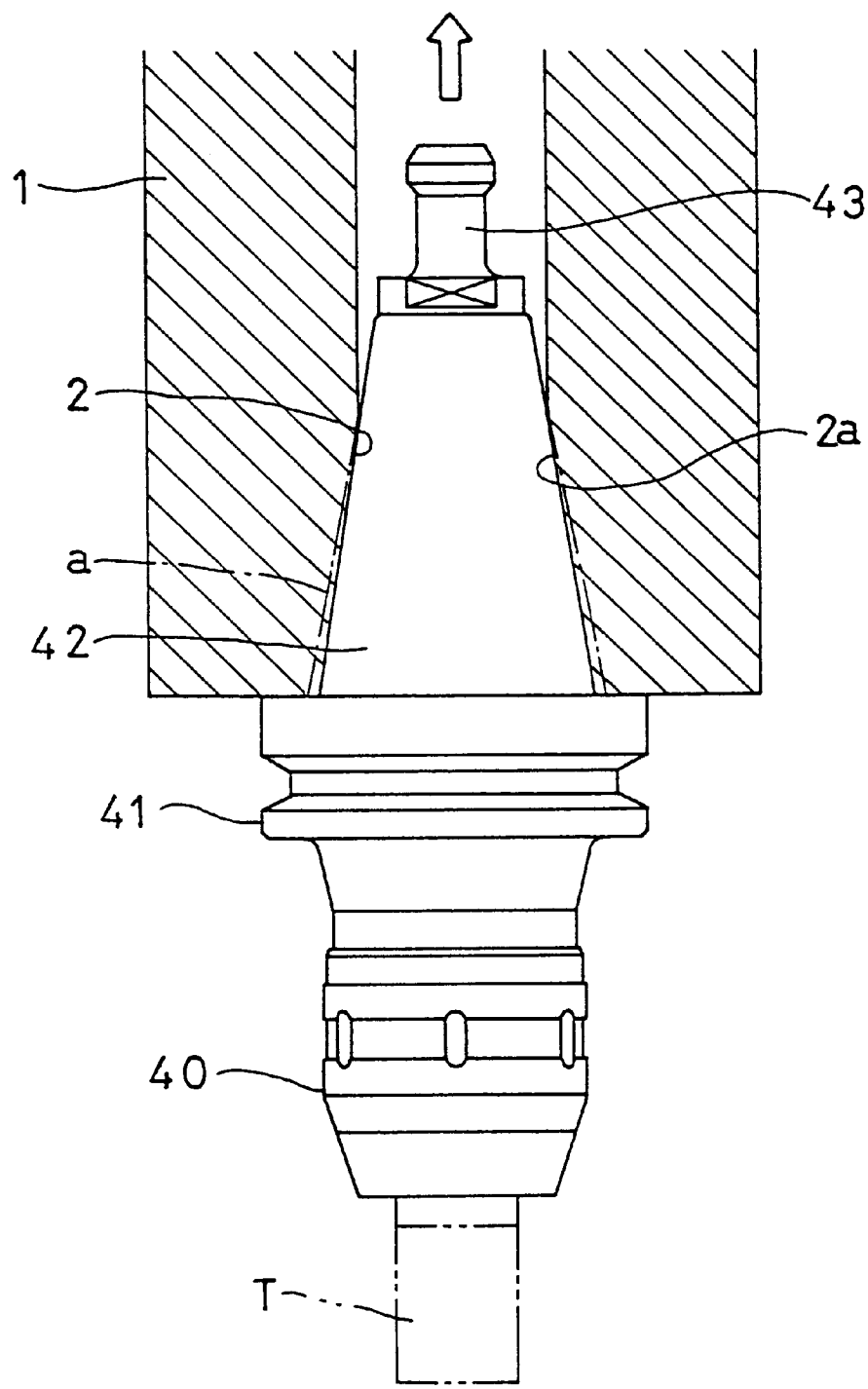
FIG. 9 is a sectional view showing another conventional tool holder.

To prevent the snap ring 25 from coming off, in the tool holder shown in FIG. 7, a radial gap between the inner peripheral surface of the bore 2 formed in the spindle 1 and the outer periphery of the snap ring 25 is smaller than the depth of the groove 24 to limit the amount by which the diameter of the snap ring 25 increases.

As mentioned above, according to this invention, when the diameter of the shank inserting bore formed in the spindle increases during high-speed revolution of the spindle, even if a gap forms between the tapered outer surface of the tapered sleeve and the tapered inner surface of the shank inserting bore, the tapered sleeve is moved by the resilient device in such a direction that the gap disappears, so that the tapered outer surface is brought into close contact with the tapered inner surface.

Also, when the tapered sleeve is axially moved, the diameter of its inner surface decreases and the tapered sleeve presses against the second cylindrical surface of the shank, so that the rigidity of the tool holder is maintained. Workpieces can thus be always machined with high accuracy.

What is claimed is:

1. A tool holder for detachably supporting a tool, said tool holder comprising a shank adapted to be inserted in a tapered bore formed in a spindle of a machine tool, a flange adapted to abut an end face of the spindle when said shank is pulled into the spindle, and a tool holding portion for detachably supporting a tool, said shank having on an outer periphery thereof a first cylindrical surface formed near its front end and a second cylindrical surface having a larger diameter than said first cylindrical surface at its rear end near said flange, said holder further comprising a tapered sleeve mounted on said shank, a resilient device axially biasing said tapered sleeve toward the front end of said shank, and fall-off prevention structure for preventing said tapered sleeve from moving off the front end of said shank, said tapered sleeve being formed with a tapered outer surface adapted to be brought into close contact with the tapered inner surface of said tapered bore formed in the spindle, and an inner surface adapted to be brought into close contact with said second cylindrical surface of said shank, and said tapered sleeve being thin enough so as to be resiliently deformable inwardly for coming into contact with the tapered inner surface of the tapered bore of said spindle when moved due to the axial bias by said resilient device, wherein relieved portions are formed in said tapered sleeve near a large-diameter end thereof, and wherein said relieved portions comprise a plurality of axial holes opening at the large-diameter end of said tapered sleeve.

2. The tool holder as claimed in claim 1 wherein said resilient device comprises belleville springs mounted between a large-diameter end of said tapered sleeve and said flange.

3. A tool holder for detachably supporting a tool, said tool holder comprising a shank adapted to be inserted in a tapered bore formed in a spindle of a machine tool, a flange adapted to abut an end face of the spindle when said shank is pulled into the spindle, and a tool holding portion for detachably supporting a tool, said shank having on an outer periphery thereof a first cylindrical surface formed near its front end and a second cylindrical surface having a larger diameter than said first cylindrical surface at its rear end near said flange, said holder further comprising a tapered sleeve mounted on said shank, a resilient device axially biasing said tapered sleeve toward the front end of said shank, and fall-off prevention structure for preventing said tapered sleeve from moving off the front end of said shank, said tapered sleeve being formed with a tapered outer surface adapted to be brought into close contact with the tapered inner surface of said tapered bore formed in the spindle, and an inner surface adapted to be brought into close contact with said second cylindrical surface of said shank, and said tapered sleeve being thin enough so as to be resiliently deformable inwardly for coming into contact with the tapered inner surface of the tapered bore of said spindle when moved due to the axial bias by said resilient device, wherein said fall-off prevention structure comprises a groove formed on the outer periphery of said shank near its front end, and a snap ring engages in said groove, and wherein means for preventing said snap ring from coming out of said groove is provided.

4. The tool holder as claimed in claim 3 wherein relieved portions are formed in said tapered sleeve near a large-diameter end thereof.

5. The tool holder as claimed in claim 4 wherein said relieved portions comprise a plurality of axial grooves formed in the inner periphery of said tapered sleeve.

6. The tool holder as claimed in claim 1 wherein said fall-off prevention device comprises a groove formed on the outer periphery of said shank near its front end, and a snap ring engaged in said groove.

7. The tool holder as claimed in claim 3 wherein said resilient device comprises belleville springs mounted between a large-diameter end of said tapered sleeve and said flange.

8. The tool holder as claimed in claim 3 wherein said means for preventing said snap ring from coming out of said groove comprises a tubular rib formed on said tapered sleeve at a small-diameter end thereof and adapted to engage the outer periphery of said snap ring.

9. The tool holder as claimed in claim 3 wherein said means for preventing said snap ring from coming out of said groove is structured such that a radial gap between the inner periphery of said bore formed in the spindle and the outer periphery of said snap ring is smaller than the depth of said groove.

\* \* \* \* \*